No. 852,028. PATENTED APR. 30, 1907.
R. D. MERSHON.
ELECTRIC MOTOR AND OTHER APPARATUS IN WHICH THERE IS MAGNETIC FLUX.
APPLICATION FILED MAR. 14, 1904. RENEWED JAN. 28, 1907.

2 SHEETS—SHEET 1.

Witnesses:
Thos. J. Byrnes
S. S. Dunham

Ralph D. Mershon, Inventor
by Kerr, Page & Cooper Attys.

No. 852,028. PATENTED APR. 30, 1907.
R. D. MERSHON.
ELECTRIC MOTOR AND OTHER APPARATUS IN WHICH THERE IS MAGNETIC FLUX.
APPLICATION FILED MAR. 14, 1904. RENEWED JAN. 28, 1907.
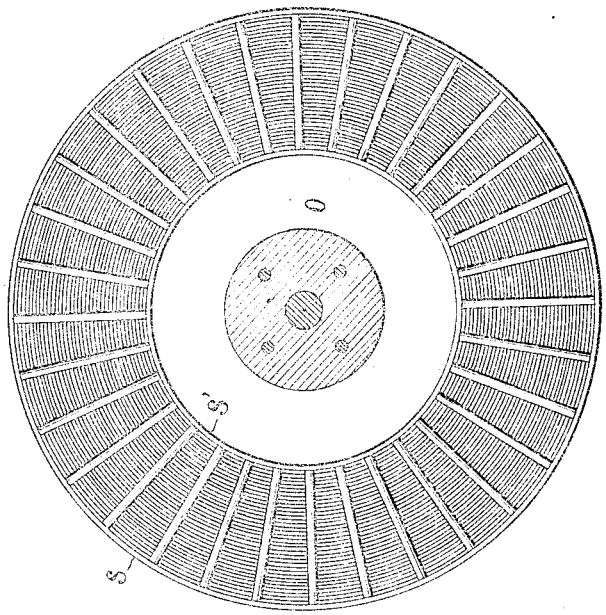
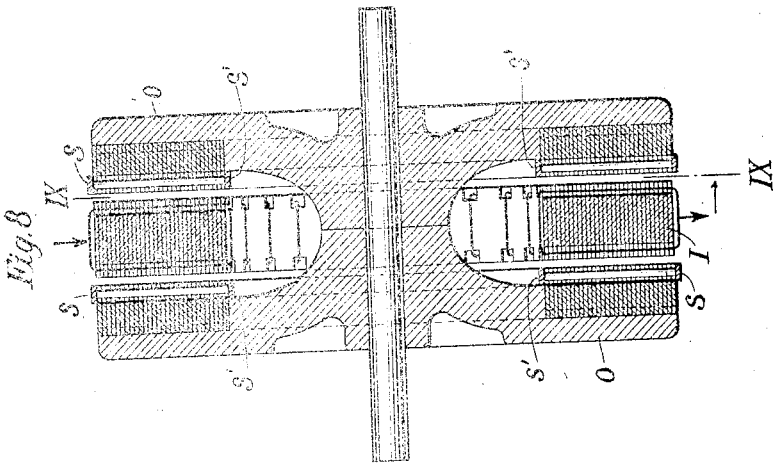

UNITED STATES PATENT OFFICE.

RALPH D. MERSHON, OF NEW YORK, N. Y.

ELECTRIC MOTOR AND OTHER APPARATUS IN WHICH THERE IS MAGNETIC FLUX.

No. 852,028.  Specification of Letters Patent.  Patented April 30, 1907.

Application filed March 14, 1904. Renewed January 28, 1907. Serial No. 354,538.

*To all whom it may concern:*

Be it known that I, RALPH D. MERSHON, a citizen of the United States, residing at New York, in the county and State of New York, have invented certain new and useful Improvements in Electric Motors and other Apparatus in Which There is Magnetic Flux, of which the following is a specification, reference being had to the drawings accompanying and forming part of the same.

The present invention relates to electric motors, generators and also to other electrical apparatus in which a magnetic flux occurs between the elements thereof across one or more air gaps, and has for its object to provide a motor or other machine of the kind mentioned which shall have a large flux surface, or area of air gap, in order to produce a greater magnetic flux for the same magnetizing current.

The invention itself, which consists in the novel features and combinations hereinafter described and more particularly set forth in the claims, is applicable to all classes of alternating or direct current motors and generators, also, as before stated, to any electrical apparatus in which there is a magnetic flux across an air gap, whether the elements thereof are relatively movable or not. One instance where they are both stationary is that of a polyphase transformer. The description here given will therefore, for the sake of simplicity and brevity, be confined to the consideration of the invention as embodied in an alternating current induction motor or generator.

Figure 1:
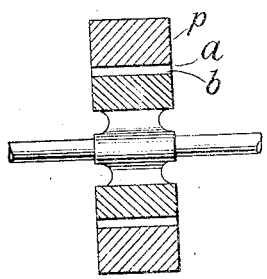
Figure 2:
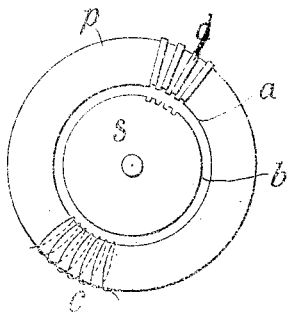
Figure 3:
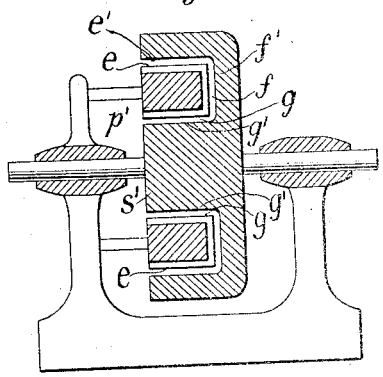
Figure 4:
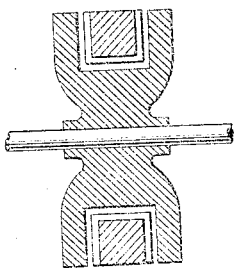
Figure 5:
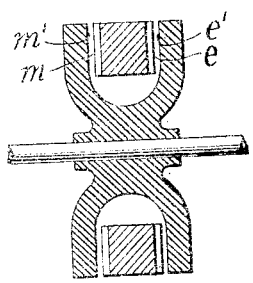
Figure 6:
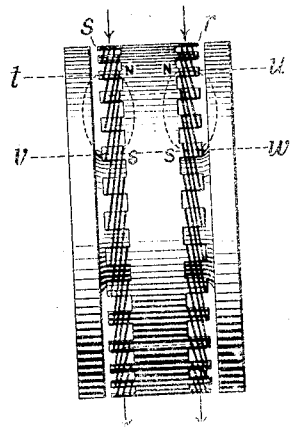
Figure 7:
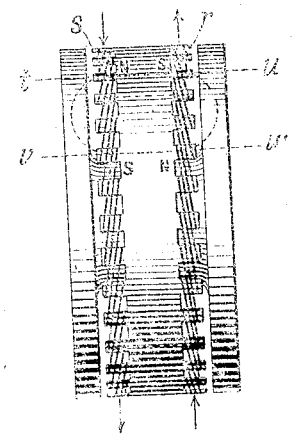

Referring now to the drawings, Figure 1 is a section showing diagrammatically a motor or generator as ordinarily constructed, with reference to the air gap between the elements. Fig. 2 is a plan view of the same, illustrating typical ring windings, as generally employed. Figs. 3, 4 and 5 are sections of machines embodying the present invention. Figs. 6 and 7 are views showing the location of poles and path of flux for different connections in the primary or exciting element of a machine embodying the present invention and provided with drum windings. Fig. 8 is a sectional view showing a machine of a form similar to that of Fig. 5, but provided with windings. Fig. 9 is a section on line IX—IX, showing the short-circuited secondary.

In the usual form of an induction motor, as typically illustrated by Fig. 1, at least one of the elements, as $p$, has an exciting winding, producing a magnetic flux between the adjacent surfaces $a$, $b$. The other element may likewise have a winding. Usually the winding of one of the elements is of the drum type, but either or both may have windings of the ring type, as indicated, for example, at $c$, Fig. 2, preferably laid in slots at $d$. It will now be seen that, although the magnetic field produced in the primary pervades the whole section of the ring, the flux between the two elements occurs only between the surfaces $a$ and $b$. In order to provide a greater area for the interchange of flux between the two elements and thereby reduce the resistance of the magnetic circuit by increasing the area of the air gap, I propose to inclose, preferably as far as possible, one element by the other, as for example inclosing or surrounding the primary by the secondary. In Fig. 3 is shown a simple way of effecting this, the primary element being indicated by $p'$ and the secondary by $s'$. In this instance the former is surrounded by the latter on three sides, so that the flux occurs not only between the surfaces $g$, $g'$, but also between $f$, $f'$ and between $e$, $e'$, thus producing a greater total magnetic flux for the same magneto-motive force. The same results may be secured by the form shown in Fig. 4, in which the inner surface and two sides of one are inclosed by the other element. In each of these cases the flux between the two elements is, disregarding the magnetic resistance of the iron portion of the magnetic circuit, which in general will be small until saturation is reached, three times that in the machine of Fig. 1. Conversely, for the same total flux in each case, the magnetizing current of Figs. 3 and 4 will be only one third that of Fig. 1. The same is in general true when drum windings are used, but the comparison between the different forms will then be less favorable in some respects for Figs. 3 and 4, since drum windings are in general not so easily or cheaply applied to the three surfaces as to one. But with the ring form we may of course consider that identically the same winding will be used in each case. The forms of Figs. 3 and 4 present a difficulty (which, however, is not insuperable), when used in alternating current apparatus, in the matter of laminating the element so as to prevent eddy current losses. But if the faces $f$, $f'$, Fig. 3, are separated, so that no flux passes between them this trouble disappears. This form then becomes equivalent to Fig. 5, in which, as is seen, only two surfaces are effective.

It is evident from the foregoing that by inclosing one element in the other the motor will require a much less magnetizing current than with the ordinary form to produce the same flux, so that a higher power factor may be obtained with the same amount of material in the machine. As will be at once seen, the advantages of the invention are greater in the case of a ring winding than in the drum form, hence when for any reason a winding of the former type is desirable the present invention may be very advantageously employed.

Considering now Figs. 6 and 7, which represent top plan views of a machine of the form shown in Fig. 5, suppose surface windings to be applied in each case to the surfaces $r$ and $s$, and that the windings are such that at a given instant they will produce fluxes along the lines $t$—$u$ and $v$—$w$, as will be the case if corresponding coils of $r$ and $s$ are directly opposite each other. Now opposite coils of $r$ and $s$ may be so connected that the equal currents occurring in them at the same instant are in the same direction, as in Fig. 6, or in opposite directions as in Fig. 7. In the former case the magnetization will be such that the poles on the opposite surfaces $r$ and $s$ are of the same sign, as in Fig. 6. In the other case the poles on these surfaces will be of opposite sign, as in Fig. 7, the magnetic flux being indicated by the dotted lines in each figure, that of Fig. 6 being the same as produced by a ring winding. In the latter figure the path of the flux through the inner element will be much longer than in the former, and hence the iron loss, in the case of an alternating flux, will be greater in Fig. 7 than in Fig. 6. Therefore by using windings on the two surfaces and properly connecting them the magnetizing current may not only be kept below that of Fig. 1 but the iron loss also.

The forms of the inner elements herein specifically shown are rectangular in cross section, a form which of course includes the square. In the rectangular forms the total area of air gap for the same amount of material is greater than in the square, since the former polygon has the greater perimeter. By lengthening the greater sides of the rectangle the total air gap surface may be increased almost indefinitely without increasing the area of the cross section and consequently the total amount of material in the element. While only rectangular forms are shown it will be at once seen that other polygonal forms may be used without departing from the scope of the invention.

In Figs. 8 and 9 is shown what I consider the most advantageous form of the invention. Here the inner element I is rectangular in cross section, as shown, to secure a considerable air gap area as before explained. The element itself is laminated, and has a ring winding laid in slots, as shown. The outer element O has two faces adjacent to the sides of the ring, each provided with slots, preferably radially arranged, in which are conductors connected at their ends to short-circuiting rings S, S'. Each face therefore constitutes a short circuited element analogous to the cylindrical form known as a squirrel cage. In the claims, however, I speak of the structure which carries the two face windings as the element, and describe it as having a plurality of wound faces, though, as before stated, strictly speaking, the two faces are two distinct elements when considered electrically. This explanation applies also to the forms shown in the other figures, in which the outer structure may be, in strictness, considered to be two elements, mechanically connected, when the faces are provided with separate and distinct windings.

What I claim is:

1. In an electrical apparatus, the combination with an annular element of polygonal cross section, windings on the opposite plane sides of the element, and means for feeding current or currents to the windings to produce poles in the same relative positions in the faces, of an annular element having a plurality of surfaces parallel and adjacent the wound faces of the others, as set forth.

2. In an electrical apparatus, the combination with an annular element of polygonal cross section having a ring winding or windings laid in slots therein, of an annular element having a plurality of faces adjacent the same number of surfaces on the first element, as set forth.

3. In an electrical apparatus, the combination with an annular element of polygonal cross section having a ring winding or windings laid in slots therein, of an annular element having a plurality of faces adjacent the same number of surfaces on the first element and having a winding or windings laid in slots in said faces, as set forth.

4. In an electrical apparatus, the combination with an annular element of polygonal cross section having a ring winding or windings laid in slots therein, of an annular element having a plurality of faces adjacent the same number of surfaces on the first element and having short-circuited windings laid in slots in said faces, as set forth.

5. In an electrical apparatus, the combination with an annular element of rectangular cross section having a ring winding or windings laid in slots therein, of an annular element having two faces adjacent the same number of surfaces on the first element and having windings laid in slots in said faces, as set forth.

6. In an electrical apparatus, the combination with an annular element of rectangular cross section having a ring winding or windings laid in slots therein, of an annular element having two faces adjacent the same number of surfaces on the first element and having short-circuited windings laid in slots in said faces, as set forth.

RALPH D. MERSHON.

Witnesses:
M. LAWSON DYER,
S. S. DUNHAM.